(12) United States Patent
Bykowski et al.

(10) Patent No.: US 10,413,962 B2
(45) Date of Patent: Sep. 17, 2019

(54) METHOD OF MAKING A BENT RAZOR BLADE

(71) Applicant: EDGEWELL PERSONAL CARE BRANDS LLC, Chesterfield, MO (US)

(72) Inventors: Henryk Bykowski, Solingen (DE); Stephan Fischer, Gevelsberg (DE); Jochen Thoene, Wuppertal (DE)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 0 days.

(21) Appl. No.: 15/980,150

(22) Filed: May 15, 2018

(65) Prior Publication Data

US 2018/0257126 A1    Sep. 13, 2018

Related U.S. Application Data

(60) Continuation of application No. 15/047,708, filed on Feb. 19, 2016, now abandoned, which is a continuation of application No. 13/354,812, filed on Jan. 20, 2012, now abandoned, which is a division of
(Continued)

(51) Int. Cl.
*B21D 53/64* (2006.01)
*B21D 5/04* (2006.01)
*B26B 21/40* (2006.01)
*B26B 21/56* (2006.01)
*B23P 15/44* (2006.01)

(52) U.S. Cl.
CPC .......... *B21D 53/645* (2013.01); *B21D 5/042* (2013.01); *B23P 15/44* (2013.01); *B26B 21/4075* (2013.01); *B26B 21/565* (2013.01)

(58) Field of Classification Search
CPC ....... B21D 53/645; B21D 5/042; B23P 15/44; B26B 21/56
USPC .......... 76/DIG. 8, 101.1; 30/50, 51, 30/346–346.61; D28/45–49
See application file for complete search history.

(56) References Cited

U.S. PATENT DOCUMENTS 3,915,757 A * 10/1975 Engel .................. C23C 14/5833
30/346.54
3,938,250 A    2/1976 Perry
4,044,463 A    8/1977 Tietjen
(Continued)

FOREIGN PATENT DOCUMENTS

CH    688646 A5    12/1997
DE    3837603 A1    5/1990
(Continued)

OTHER PUBLICATIONS

International Search Report dated Apr. 2007, for PCT/US2009/042678.
(Continued)

*Primary Examiner* — Jason Daniel Prone

(57) ABSTRACT

A method for making a bent razor blade is disclosed. The method includes: providing an elongated strip of stainless steel that can be 0.076 mm thick; hardening the strip; providing a cutting edge along an edge of the strip and providing coating(s) on the cutting edge. The stainless steel has a carbon content less than 0.60% and preferably between 0.45% and 0.55% by weight. The strip is separated lengthwise into discrete razor blades. The bent portion of the razor blade is then formed using a swivel bending process.

5 Claims, 9 Drawing Sheets

Related U.S. Application Data application No. 12/434,852, filed on May 4, 2009, now abandoned.

(60) Provisional application No. 61/050,275, filed on May 5, 2008.

(56) References Cited

U.S. PATENT DOCUMENTS

| | | | |
|---|---|---|---|
| 4,302,876 A | | 12/1981 | Emmett |
| 4,352,282 A | | 10/1982 | Buske |
| 4,391,119 A | | 7/1983 | Schmitz |
| 4,551,916 A | | 11/1985 | Jacobson |
| 4,603,477 A | | 8/1986 | Francis |
| 4,621,424 A | | 11/1986 | Jacobson |
| 4,782,590 A | | 11/1988 | Pope |
| 5,007,264 A | | 4/1991 | Haack |
| 5,010,646 A | * | 4/1991 | Neamtu ............... B26B 21/227 30/41 |
| 5,199,173 A | | 4/1993 | Hegemann et al. |
| 5,239,853 A | | 8/1993 | Kutschker |
| 5,259,231 A | | 11/1993 | Kutschker |
| 5,275,672 A | | 1/1994 | Aithaus et al. |
| 5,305,526 A | * | 4/1994 | Althaus ............... B26B 21/4006 30/346.54 |
| 5,313,706 A | | 5/1994 | Motta et al. |
| 5,369,885 A | | 12/1994 | Ferraro |
| 5,416,974 A | | 5/1995 | Wain |
| 5,433,801 A | | 7/1995 | Althaus et al. |
| 5,522,137 A | | 6/1996 | Andrews |
| 5,551,153 A | | 9/1996 | Simms |
| 5,823,031 A | | 10/1998 | Campbell |
| 5,985,459 A | | 11/1999 | Kwiecien et al. |
| 6,161,268 A | | 12/2000 | Andrews |
| 6,293,020 B1 | | 9/2001 | Julien |
| 6,295,734 B1 | | 10/2001 | Gilder et al. |
| 6,601,303 B2 | | 8/2003 | Gilder et al. |
| 6,619,098 B2 | | 9/2003 | Lisec |
| 6,763,593 B2 | * | 7/2004 | Nakatsu ............... B26B 21/58 30/346.53 |
| 7,024,776 B2 | | 4/2006 | Wain |
| 7,100,284 B2 | | 9/2006 | King |
| 7,213,438 B2 | | 5/2007 | Klinkhammer |
| 7,730,619 B2 | | 6/2010 | Ozenick |
| 7,827,894 B2 | | 11/2010 | Mincer |
| 8,225,510 B2 | | 7/2012 | Peterson et al. |
| 8,316,550 B2 | * | 11/2012 | Howells ............... B26B 9/00 30/350 |
| 8,322,253 B2 | | 12/2012 | Howells |
| 8,327,545 B2 | | 12/2012 | Peterson |
| 2002/0144404 A1 | | 10/2002 | Gilder et al. |
| 2003/0182602 A1 | | 10/2003 | Vega et al. |
| 2007/0124939 A1 | | 6/2007 | Van Elbergen Santhagens |
| 2007/0186424 A1 | | 8/2007 | Becker et al. |
| 2007/0234576 A1 | | 10/2007 | Masek et al. |
| 2007/0234577 A1 | | 10/2007 | Masek et al. |
| 2008/0257004 A1 | | 10/2008 | Spaeth |
| 2009/0112200 A1 | | 4/2009 | Eggers |
| 2010/0107425 A1 | | 5/2010 | Bykowski |
| 2011/0314678 A1 | | 12/2011 | Peterson |
| 2012/0132036 A1 | | 5/2012 | Bykowski et al. |
| 2012/0311865 A1 | | 12/2012 | Hamilton et al. |

FOREIGN PATENT DOCUMENTS

| | | |
|---|---|---|
| EP | 0077183 A2 | 4/1983 |
| EP | 0256974 A2 | 1/1993 |
| EP | 1810761 A1 | 1/2007 |
| EP | 1916498 A1 | 10/2007 |
| FR | 2553031 A1 | 9/1984 |
| GB | 2055069 A | 7/1980 |
| WO | 9910116 A1 | 3/1999 |
| WO | 2004112986 | 12/2004 |
| WO | 2009137389 A1 | 11/2009 |

OTHER PUBLICATIONS

International Preliminary Report on Patentability for PCT/US2009/042678.

English Translastion of CH688646.

* cited by examiner

METHOD OF MAKING A BENT RAZOR BLADE

CROSS REFERENCE TO RELATED APPLICATIONS

This application is a continuation of U.S. patent application Ser. No. 15/047,708, filed Feb. 19, 2016, which is a continuation of U.S. patent application Ser. No. 13/354,812, filed Jan. 20, 2012 which is a division of U.S. patent application Ser. No. 12/434,852, filed May 4, 2009, now abandoned, which claims priority to U.S. provisional patent application Ser. No. 61/050,275 filed May 5, 2008, the disclosures of which are incorporated herein for reference in their entireties.

BACKGROUND

1. Technical Field

The present disclosure relates to razor blades in general and, more particularly, to a razor blade having a bent portion and a method and apparatus for manufacturing the same.

2. Background

Many modern safety razors include a disposable razor cartridge adapted to be selectively connected to a reusable handle by connecting structure therebetween. The cartridge includes a frame having at least one razor blade with a sharpened cutting edge disposed therein. Other modern safety razors include a razor cartridge permanently connected to the handle that can be disposed of as a single unit.

The performance and commercial success of a razor cartridge is a balance of many factors and characteristics that include rinsability i.e. the ability of the user to be able to easily rinse cut hair and skin particles and other shaving debris from the razor cartridge and especially from between adjacent razor blades or razor blade structures such as those disclosed in U.S. Pat. No. 4,586,255 to Jacobson.

A razor cartridge including a razor blade having a bent portion can have certain advantages and there have been many proposals to provide a razor cartridge with such a razor blade. Some examples are disclosed in U.S. Pat. No. 4,389,773 to Nissen et al, several to Jacobson including U.S. Pat. Nos. 4,442,598, 5,010,646 to Neamtu, U.S. Pat. No. 6,804,886 to Wain and also G.B. patent 2,055,069 to Davis, the latter two patents ('886 and G.B. '069) going on to disclose methods of forming the razor blade using a press tool. However, such razor cartridges have not been successfully commercialized or at least not manufactured on a scale that is significant in a mass market such as that of razor cartridges. Many manufacturers emulate a bent razor blade by mounting a generally planar razor blade on a bent support made from a material both thicker and softer than a typical hardened razor blade. The aforementioned '255 patent includes an example of such a construction.

Challenges to the manufacture of a commercially acceptable razor cartridge with a bent blade include manufacturing issues such as cracking occurring in a hardened blade body in the vicinity of the bend and more especially on the outer surface of the bend. While cracks of a micro scale located in the outer surface of the bend may be acceptable, cracks of a macro scale can have the following disadvantages: a crack itself is a fracture in the blade body but also provides an initiation site that facilitates further fracture or even breakage of the razor blade during normal use when mounted in its cartridge housing. Cracks also can provide initiation sites for accelerated corrosion that can also result in failure of the razor blade. Failure or fracture of a razor blade can result in nicks and cuts for the user.

SUMMARY

The present disclosure has for its objective to eliminate, or at least substantially alleviate the limitations of the prior art razor blade arrangements. The present disclosure is directed particularly to a method of making a razor blade having a bent portion. The razor blade has a cutting edge and a back edge portion, a bent portion between the cutting edge and the back edge portion, and first and second generally planar portions respectively between the cutting edge and the bent portion and the bent portion and the back edge portion.

The razor blade is manufactured from an elongated strip of stainless steel. The stainless steel has a carbon content preferably less than about 0.60%, more preferably between about 0.45% and about 0.55% and can also comprise between about 1.0% and about 1.6% molybdenum, both by weight. The stainless steel strip is preferably equal or less than 0.1 mm thick, preferably 0.076 mm and can be 0.025-0.05 mm thick. The stainless steel strip is preferably about 3 mm wide but can be any width to suit the application at hand. The stainless steel strip is hardened to about 660-850 HV and the strip provided with a cutting edge along at least one edge. As disclosed herein, cited hardness values use the Vickers scale at a load of 0.5 kg. The cutting edge is provided with suitable coatings that can include a hard carbon material and an outer coating of a cured fluoropolymer, preferably PTFE. The (PTFE) curing process has a secondary effect of annealing the strip to reduce the hardness of the strip to at least 600 HV and preferably about 620-640 HV. A lengthwise extending portion of the strip is removed to provide a discrete razor blade. The bent portion of the razor blade is preferably formed by swivel bending processes as described herein. By this method, when the forming results in an included angle of less than 118 degrees and preferably about 90 degrees between the first and second planar portions, in combination with a minimum inside bend radius less than 0.50 mm and preferably about 0.30-0.35 mm, the outer surface of the bent portion is substantially free from macro-cracks. In the context of the present disclosure a macro-crack is defined as a crack in the outer surface of the bend having a depth greater than ⅔ the thickness of the strip.

In a further aspect, the razor blade can include one or more apertures. The process step to perforate the apertures can occur after the discrete razor blade is cut from the strip and before the bent portion is formed.

A plurality of blades in accordance with the aforementioned description, can be conveniently mounted in a cartridge housing which can provide a razor cartridge.

In addition the present disclosure describes embodiments of forming tooling for making razor blades having a bent portion.

An advantage of the disclosed razor blade having a bent portion is that it can be used in a razor cartridge as an alternative to a planar razor blade mounted on a thicker bent support. Avoidance of the thicker bent support facilitates improved rinsability of the cartridge. Use of the disclosed stainless steel material in combination with the disclosed method of bending can avoid any necessity to provide a local secondary heat treatment process to a portion of the blade body to enhance ductility and results in a bent portion having its outer surface substantially free of macro-cracks. However, a localized heat treatment process can be used with the present material and method combination if desired. Premature failure of the razor blade is avoided or the probability of failure is substantially diminished, thereby improving safety for the user.

The above features and advantages will be more fully understood with reference to the following detailed description when taken in conjunction with the accompanying drawings.

DETAILED DESCRIPTION

Martensitic stainless steels having a carbon content 0.6-0.7% or more, about 13% chromium and substantially free of molybdenum are widely used for making razor blades. These materials are widely available, have adequate corrosion resistance for their intended use and can be sharpened to provide a high quality cutting edge. However, these materials are somewhat brittle and razor blades formed thereof are not readily bent without cracking or fracturing. U.S. Patent application publications 2007/0124939 and 2007/0234577 disclose methods of locally heat treating a portion of a hardened razor blade body to enhance ductility and thus facilitate formation of a bent portion.

U.S. Pat. Nos. 5,275,672 and 5,433,801, both to Althaus et al. disclose razor blade steel having high corrosion resistance, the disclosures of both are hereby incorporated in their entireties for reference. The Applicants of the present disclosure have discovered that materials having certain compositional similarities to the materials disclosed in the aforementioned Althaus et al. patents have unexpected additional utility for a razor blade having a bent portion when used in combination with a forming process including swivel bending, described later in the present disclosure.

Figure 4:
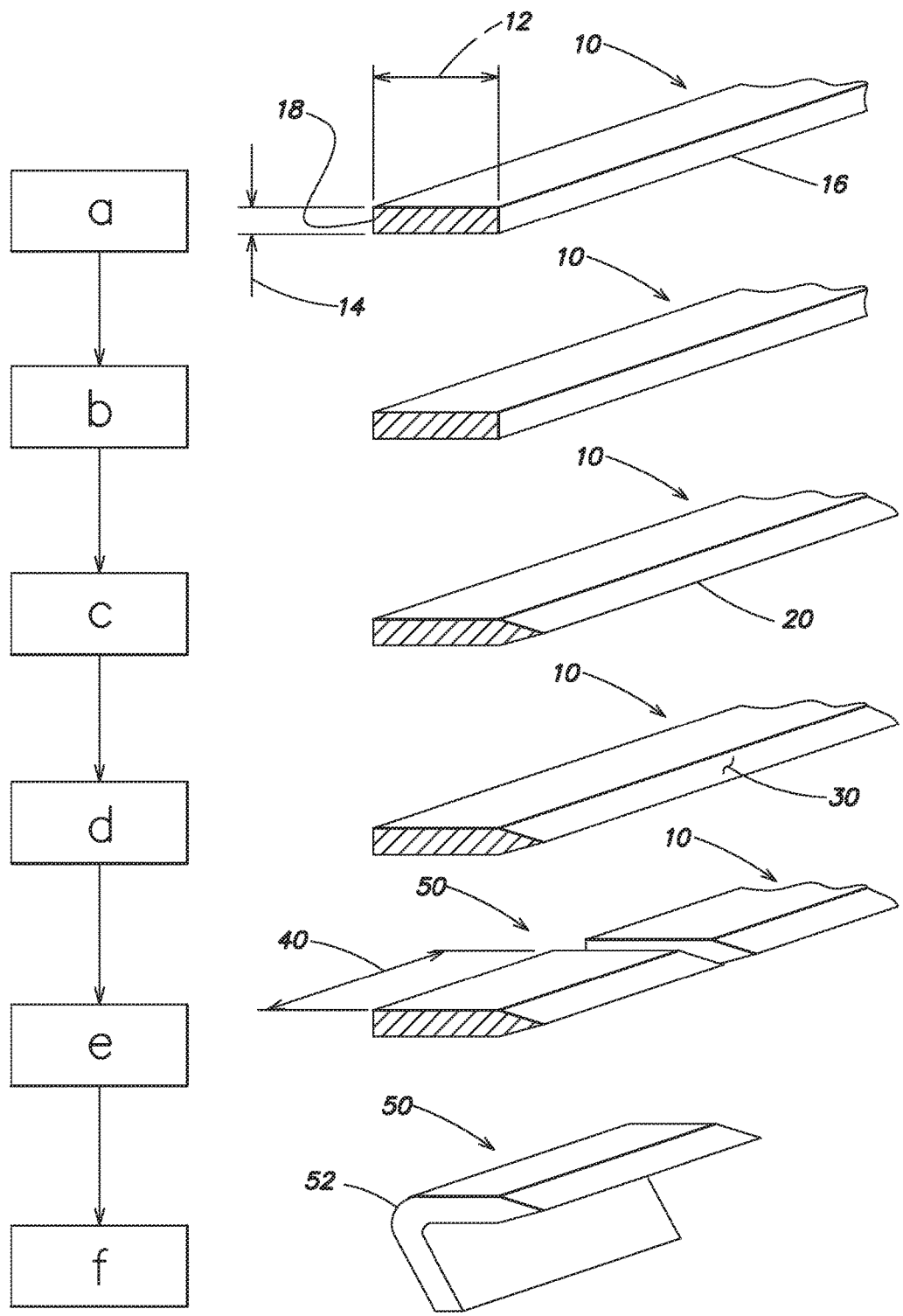
FIG. 4 is a schematic representation of the process steps of the present disclosure.

Referring now to the drawings and in particular FIG. 4, exemplary process steps for the manufacture of a so-called single edge razor blade having a bent portion are schematically depicted. Elongated stainless steel strip 10, as provided, is depicted at step (a). The strip has a width 12 and a thickness 14 and includes a front edge portion 16 and a back edge portion 18. The width of the strip is preferably about 3 mm wide but can be any width to suit the application at hand from about 2 mm or less to about 22 mm or more.

The thickness of the strip can be 0.1 mm or less and is preferably about 0.076 mm and in some cases strip having a thickness of about 0.025-0.05 mm can be employed. The steel preferably conforms to the compositions of the aforementioned Althaus et al. patents and is preferably the grade designated GIN7 manufactured by HITACHI METALS. The steel has a carbon content less than about 0.60%, preferably in the range 0.45% to 0.55%, but can also be about 0.4%. The steel can also have a molybdenum content in the range about 1.0% to about 1.6%. At step (b) the strip 10 is hardened to a hardness about 660-850 HV by well known process(es). At step (c) the front edge is sharpened by any well known sharpening process such as grinding and honing to provide an elongated cutting edge 20. At step (d) suitable coating(s) 30 are applied to the cutting edge by well known processes. One or more under-coatings can include, but are not limited to, one or more of chromium, platinum, niobium, titanium, alloys of the aforementioned materials and compounds of the aforementioned materials compounded with e.g. carbon or nitrogen. A suitable titanium coating is disclosed in commonly assigned U.S. patent application publication 2007/0186424 the disclosure of which is hereby incorporated for reference in its entirety. Also various types of hard carbon coatings such as amorphous diamond, diamond-like-carbon (DLC) and combinations with the above can be applied. An outer coating of a fluoropolymer material, preferably PTFE is applied. A suitable PTFE coating is disclosed in commonly assigned U.S. patent application publication 2007/0124944 the disclosure of which is hereby incorporated for reference in its entirety, but the present application is not limited in this regard and any suitable PTFE coating can be employed. The PTFE coating can be cured and the curing process has the secondary effect of annealing at least the portion of the strip containing the cutting edge to at least 600 HV and preferably about 620-640 HV. At step (e) a lengthwise extending portion 40 is cut from the strip to provide a discrete razor blade 50. The discrete razor blade has properties of the strip from which it was cut. At step (f) the razor blade 50 is bent as will be described later to provide a bent portion 52.

As an alternative to the aforementioned, certain preliminary process steps can undertaken to manufacture a double-edge razor blade. Strip material having a suitable width (e.g. about 22 mm) is perforated in continuous strip form to provide apertures that can include an elongated center slot that can be used to support or locate the blade strip during subsequent processes such as edge forming and edge coating and location holes that can be used to index the strip or to locate a discrete razor blade during certain processes. Process steps (b) and (c) are performed as described above, with an exception that both the front edge and back edge are sharpened to provide cutting edges. The elongated strip is then separated into discrete double edge razor blades. Process step (d) is performed to both cutting edges as described above. The double edge razor blade is then split preferably adjacent the ends of the center slot to provide two single edge razor blades. Thereafter process step (f) is performed as described above.

Figure 5A:
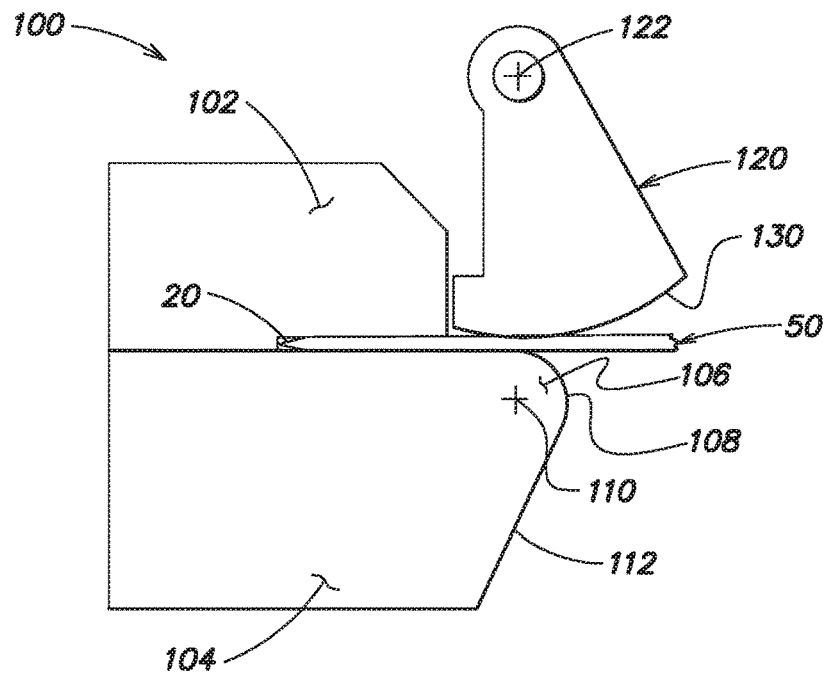
FIGS. 5A; 5B; 5C; 5D are schematic views of a razor blade in forming tooling at various positions.
Figure 5B:
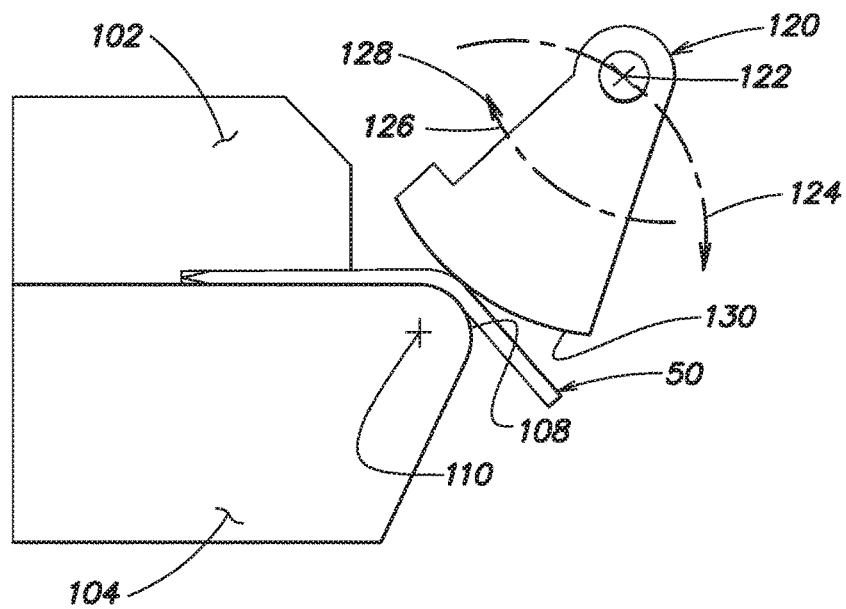
FIG. 5E is a schematic view of another embodiment of the forming tooling of FIGS. 5A-5D.
Figure 5C:
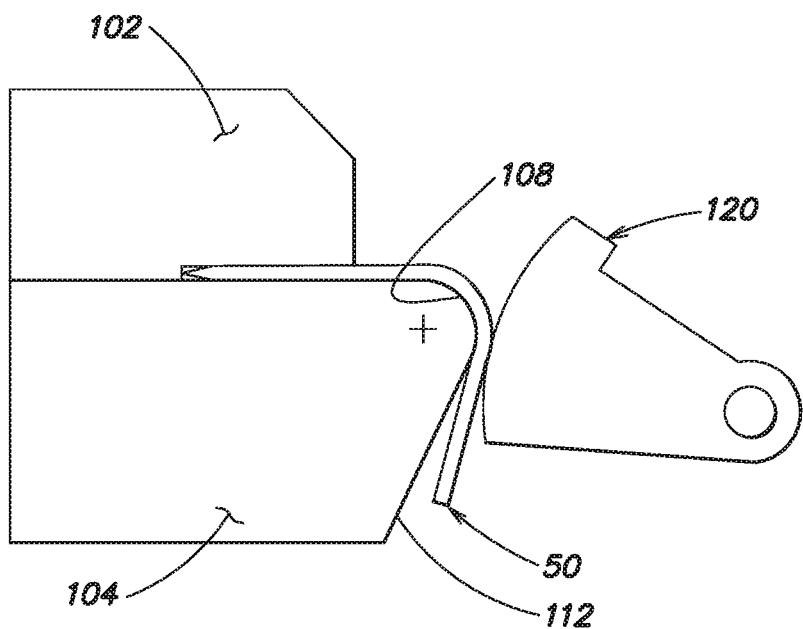
Figure 5D:
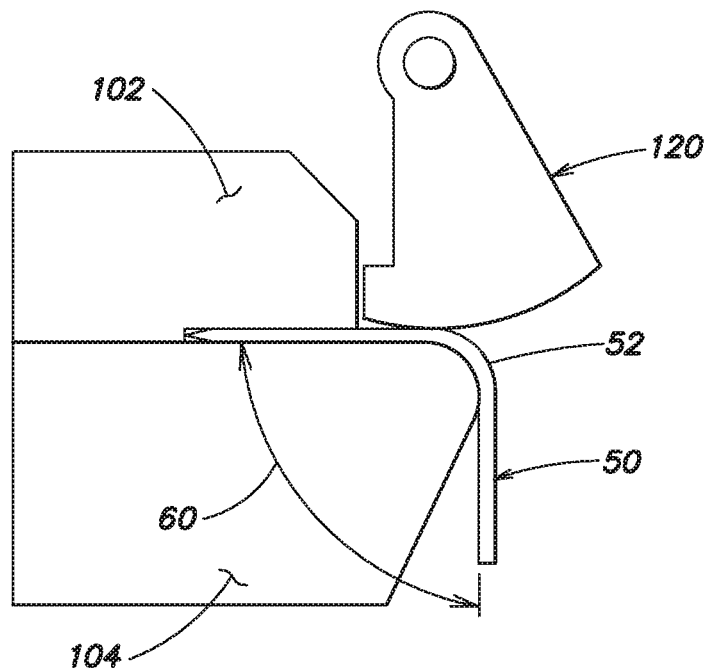

Referring now to FIGS. 5A-5E, and in particular FIG. 5A, a discrete razor blade 50 is mounted in suitable tooling 100 to provide a bent portion (52 in FIG. 5D) in the razor blade by a swivel bending process. Preferably the portion of the razor blade adjacent the cutting edge 20 is clamped between first and second jaws 102, 104 respectively with the opposed edge portion extending outward therefrom. Portions of the extreme ends of the cutting edge of the razor blade abut a reference surface of one of the jaws so that the razor blade is in an accurately defined location relative to the tooling so that the position can be precisely repeated to provide bent portions for further razor blades. The second jaw 104 includes a protrusion 106 having a parti-cylindrical form 108 having axis 110. Face 112 provides clearance relief for over-bending as will be described later. Nose 120 is applied to the surface of the blade adjacent the first jaw with a predetermined contact pressure between an arcuate surface 130 of the nose and the mating blade surface. The contact pressure is preferably about 25 N for a razor blade of the preferred GIN7 material of the preferred 0.076 mm thickness but can be varied to suit other razor blade materials and other thicknesses. The nose is pivotally supported about nose axis 122. Referring now to FIG. 5B, which depicts a hypothetical interim condition of the swivel bending process, axis 122 of nose 120 is rotated around axis 110 of the second jaw 104 to cause the blade to be formed around parti-cylindrical form 108. The path of axis 122 is depicted as arc 124. As arcuate surface 130 of the nose is against the blade surface with a defined contact pressure the arcuate surface rolls without sliding relative to the blade surface and the nose pivots about axis 122, depicted as arc 126 in the direction indicated by arrow 128. Referring now to FIG. 5C, the blade is bent around parti-cylindrical form 108 to over-bend the razor blade to compensate for ensuing elastic recovery. Referring to FIG. 5D, the nose 120 is retracted to its starting position and inherent elastic recovery of the blade causes it to relax to its desired form, including a bent portion 52. As depicted, the included angle 60 defined by the bent portion is about 90 degrees, however the present application is not limited in this regard and other angles are within the scope of the present disclosure.

Figure 5E:
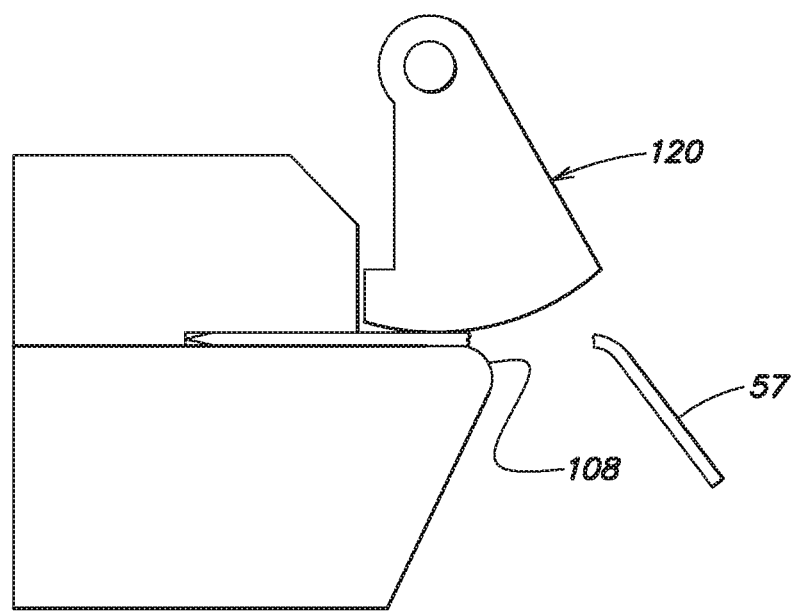

The parti-cylindrical form 108 is sized to provide a bent portion 52 of the razor blade that preferably has an effective inside radius about 0.30 to about 0.35 mm. A larger inside radius (e.g. about 0.5 mm or more) is less preferred as a blade having a thickness 0.076 mm requires excessive overbending to yield a desired included angle, however a larger radius can have utility for thinner blades (e.g. less than 0.076 min thick). A smaller inside radius (e.g. smaller than about 0.15 mm) can result in a blade of thickness 0.076 mm fracturing in the vicinity of the bent portion and this phenomenon can be used to separate a removable portion 57 as depicted in FIG. 5E which depicts the nose 120 retracted to its starting position at the conclusion of a cycle of the tooling. This effect can have utility where it is desirous to manufacture a blade narrower than the width of the strip, e.g. 1-2 mm. This effect can avoid any necessity to attach a blade to a bent support prior to fracturing a removable portion as is disclosed in U.S. Pat. No. 6,629,475 to Neamtu et al. or providing a weakened portion for the razor blade using thermal energy as is disclosed in U.S. Patent application publication 2006/0000526.

Referring now to FIGS. 6A-6D a discrete razor blade 50 is mounted in another embodiment of suitable tooling 200 to provide a bent portion in the razor blade. The tooling parts and operation steps are generally similar to those described in FIGS. 5A-5D with exceptions that the blade portion opposed the cutting edge can be located and clamped and the nose 220 is pivotal about axis 210 of parti-cylindrical surface 208 only. Consequently, the tip portion 230 of the nose slides against the surface of the razor blade as the nose rotates about axis 210, depicted as arc 224, in the direction indicated by arrow 223.

Figure 6A:
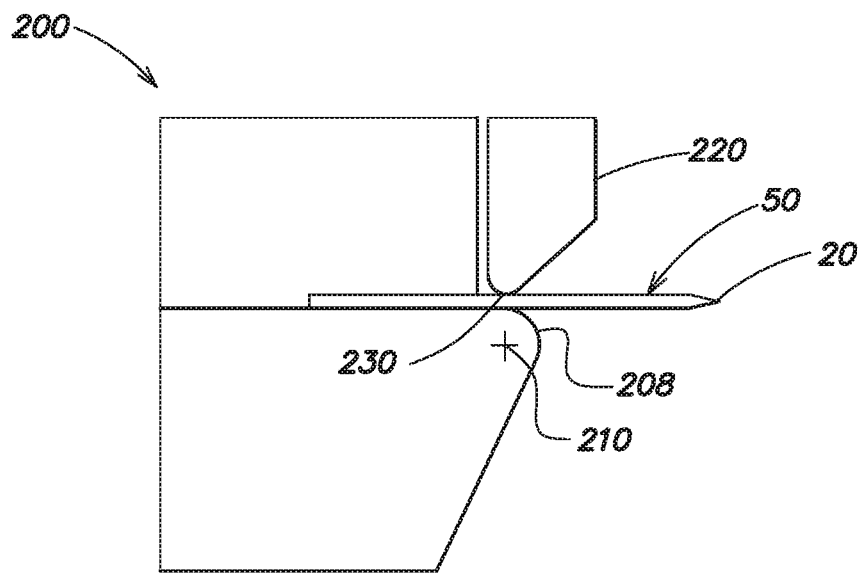
FIGS. 6A; 6B; 6C and 6D are schematic views of a razor blade in another embodiment of forming tooling at various positions.
Figure 6B:
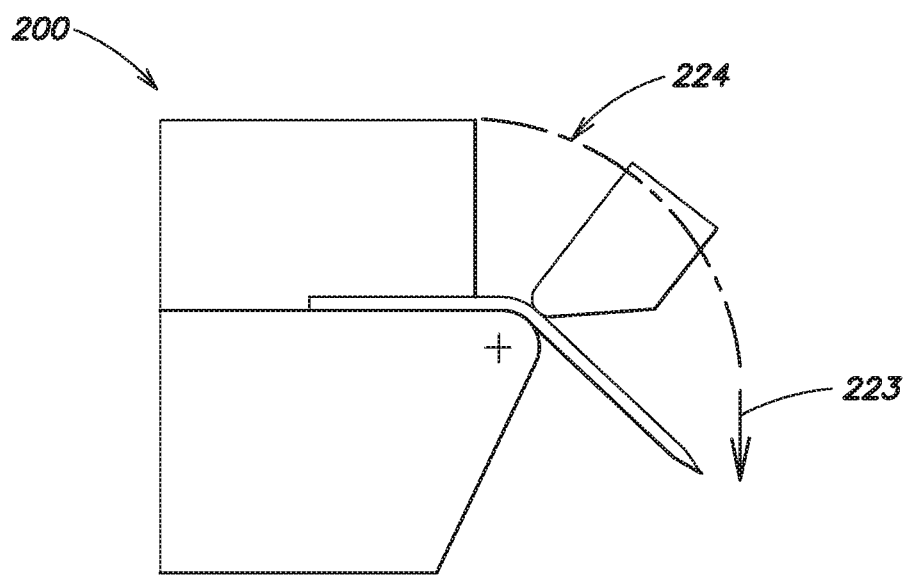
FIG. 6E is a schematic view of a further embodiment of a razor blade of the present disclosure in another embodiment of forming tooling.
Figure 6C:
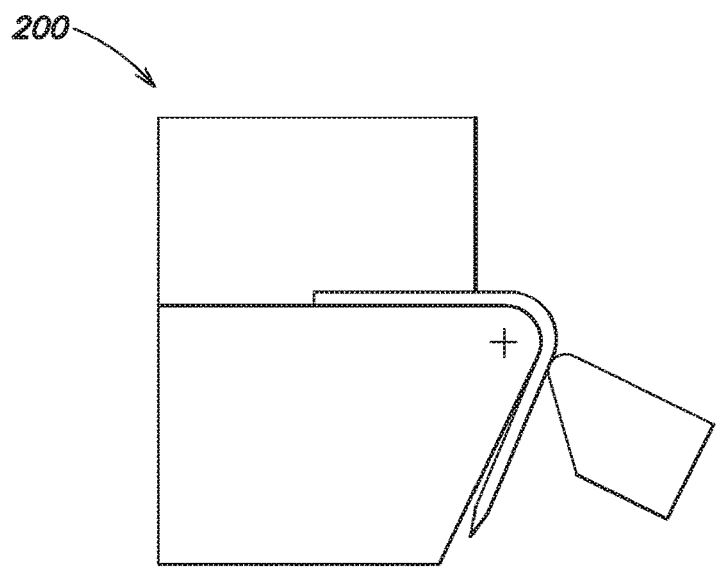
Figure 6D:
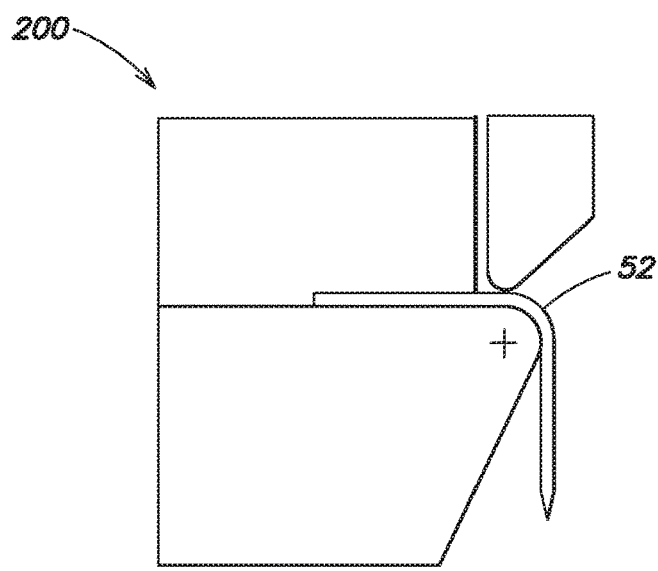
Figure 6E:
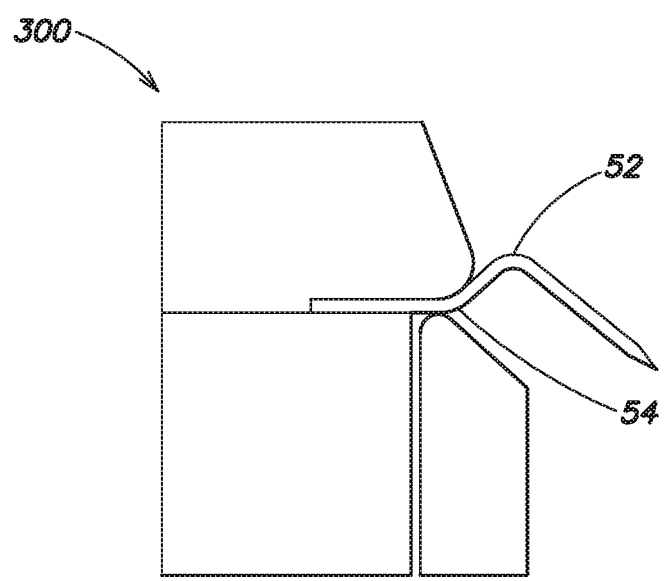

As depicted in FIG. 6E, the razor blade having a first bent portion can subsequently be mounted in further suitable tooling 300 to provide a second bent portion 54. The tooling can be of the type depicted in FIGS. 5A-5D or 6A-6D, having a pivotal or non-pivotal nose.

Figure 1:
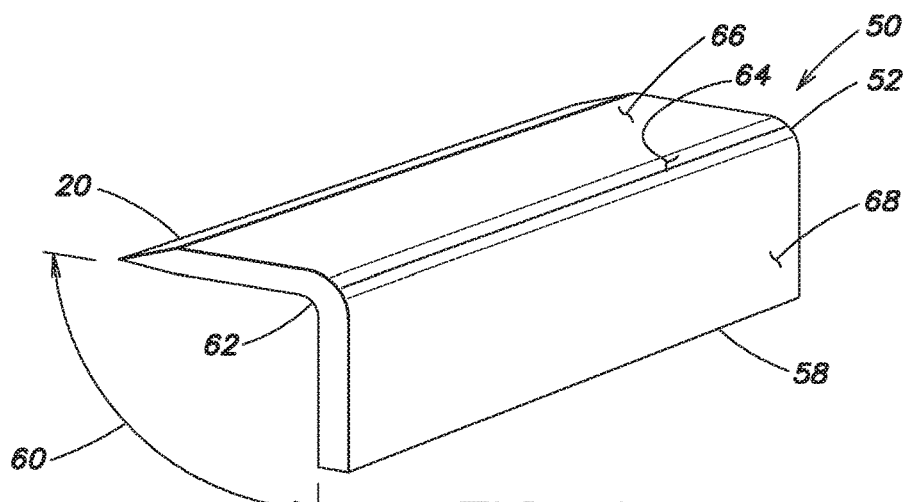
FIG. 1 is an isometric view of an embodiment of a razor blade of the present disclosure.
Figure 2:
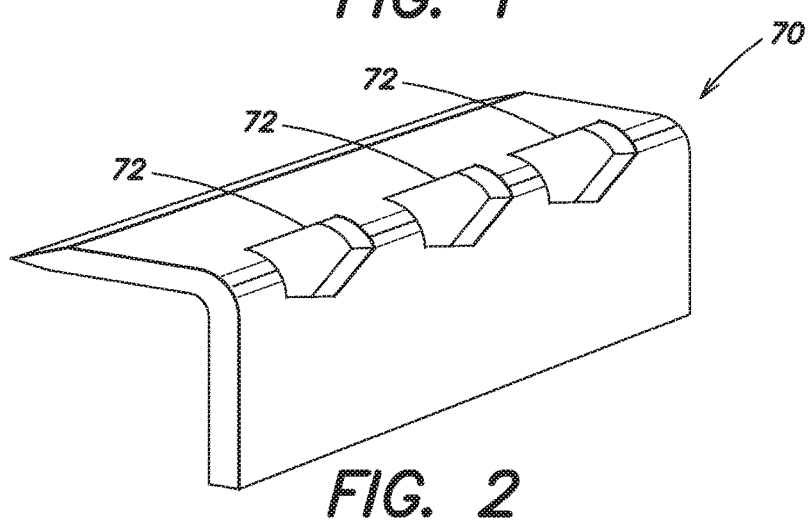
FIG. 2 is an isometric view of another embodiment of a razor blade of the present disclosure.
Figure 3:
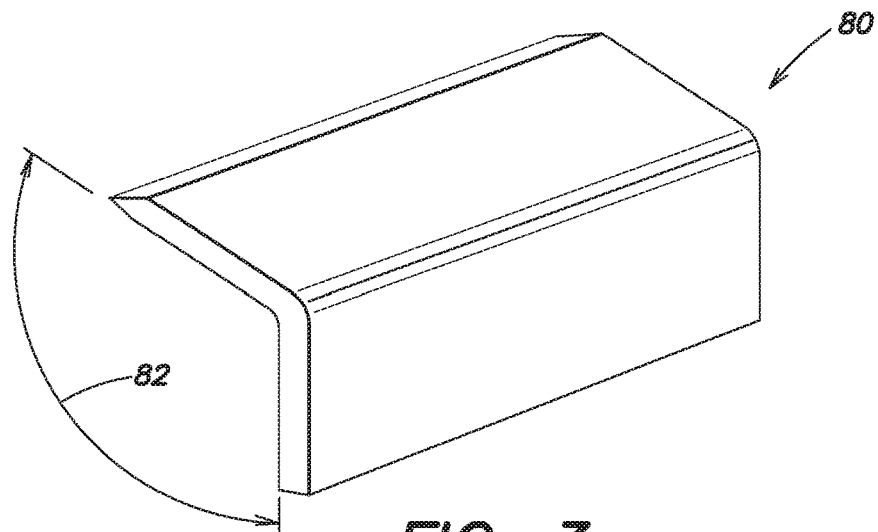
FIG. 3 is an isometric view of a further embodiment of a razor blade of the present disclosure.

Referring now to FIGS. 1-3, exemplary embodiments of razor blades having bent portions are depicted. The razor blade 50 of FIG. 1 has a cutting edge portion 20 and a back edge portion 58. A bent portion 52 is between the cutting edge portion and the back edge portion. The bent portion has an inner surface 62 and an outer surface 64. A first generally planar portion 66 is between the cutting edge portion and the bent portion and a second generally planar portion 68 is between the bent portion and the back edge. The first and second planar portions define an angle 60 therebetween, preferably about 90 degrees. The inner surface 130 of the bent portion preferably includes a radius preferably between 0.12 mm and 0.5 mm and most preferably is parti-cylindrical having a radius about 0.30-0.35 mm for a razor blade 0.076 mm thick. The razor blade 70 of FIG. 2 is similar to that of FIG. 1 but includes a plurality of apertures 72 provided to further enhance rinsibility when the razor blade is mounted in its cartridge housing. The apertures are preferably provided by a well known punch and die tool in a process step after the discrete razor blade is cut from its elongated strip and before the bent portion is formed. The apertures can also be formed in a process step before the strip is hardened in a well known progressive perforation tool. The razor blade 80 of FIG. 3 is similar to that of FIG. 1 but includes an angle 82 between planar portions other than about 90 degrees, e.g. less than about 118 degrees between the first and second planar portions.

The outer surfaces of the bent portions of the razor blades of the material(s) and process(es) described above are substantially free from macro-cracks. In the context of the present disclosure a macro-crack is defined as a crack in the outer surface of the bend having a depth greater than ⅔ the thickness of the strip.

Figure 7:
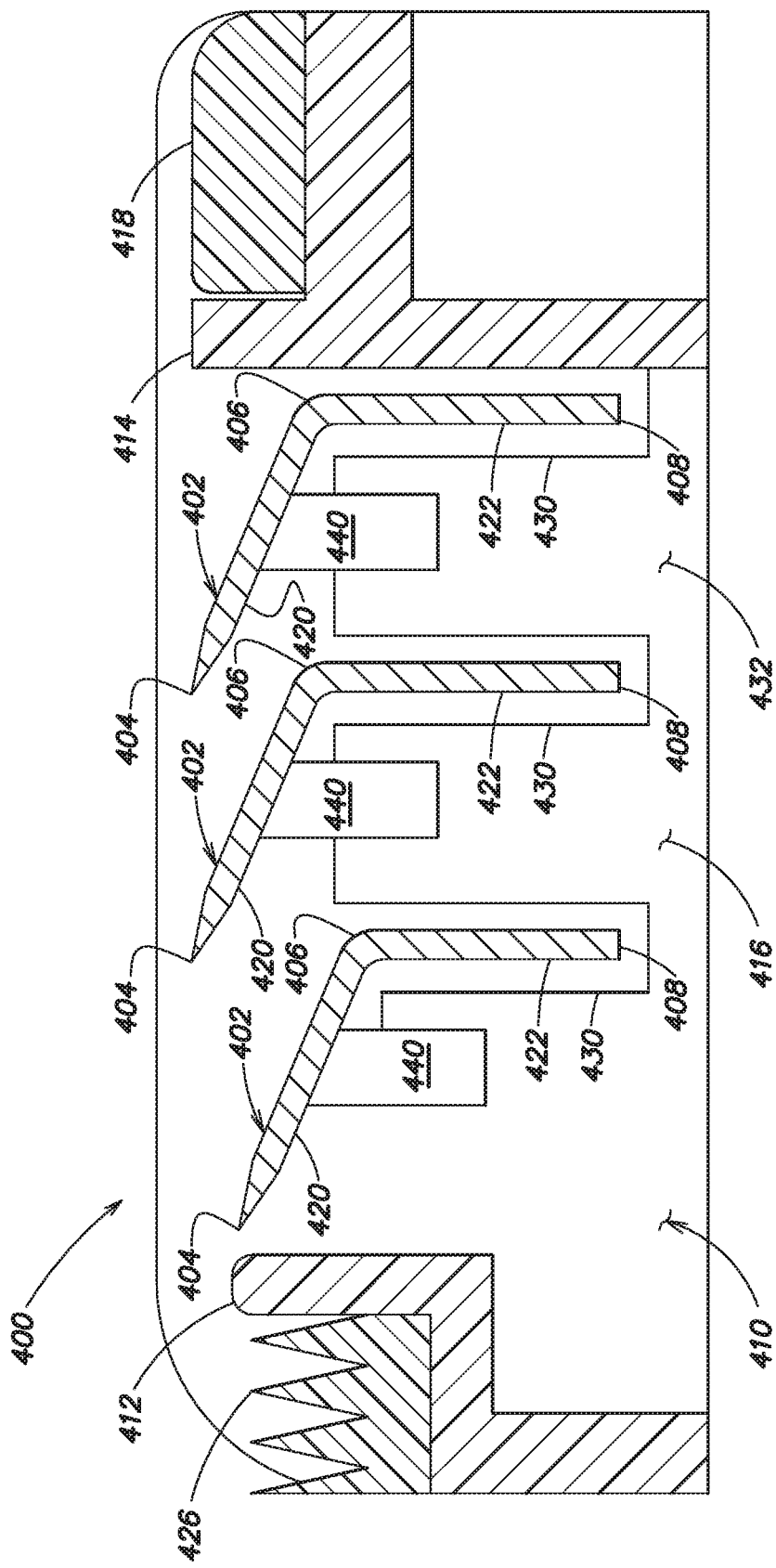
FIG. 7 is a sectional schematic view of an exemplary razor cartridge including a plurality of razor blades of the present disclosure.

Referring now to FIG. 7, a sectional schematic view of a razor cartridge 400 including a plurality of razor blades 402 each having respective cutting edges 404, bent portions 406, back edge portions 408 and first and second planar portions 420, 422 respectively is depicted. The cartridge includes a housing 410 that comprises a guard 412, a cap 414 and a blade mounting region 416. The guard and the cap can comprise, respectively, elastomeric and lubricious elements 426, 418, as are well known in the art. The second planar portion 422 of the razor blade between the bent portion 406 and the back edge portion 408 is disposed in a slot 430 of end wall 432 of the housing. A spring element 440 can be provided preferably under the first planar portion 420 of the razor blade as is well known in the art.

While various embodiments have been described above, it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above described exemplary embodiments, but should be defined only in accordance with the following claims and their equivalents.

What is claimed is:

1. A method of making a razor blade, comprising:
   providing a stainless steel strip having a carbon content in a range 0.45% to 0.55%; forming a cutting edge along a front edge of the strip and cutting the strip into a lengthwise extending portion;
   providing a forming tool having:

a first jaw;

a second jaw that includes a parti-cylindrical surface, wherein the parti-cylindrical surface of the second jaw of the forming tool has an axis; and a nose having an arcuate contact surface;

clamping the lengthwise extending portion of the strip relative to the tool at a position such that the cutting edge is between the first jaw and the second jaw and a back edge portion of the strip extends outwardly from and beyond the parti-cylindrical surface of the second jaw of the forming tool;

disposing the arcuate contact surface of the nose of the forming tool in contact with a first surface of the lengthwise extending portion of the strip adjacent the first jaw at a position adjacent the parti-cylindrical surface; and moving the nose of the forming tool along the parti-cylindrical surface of the second jaw of the forming tool with the surface of the lengthwise extending portion of the strip adjacent the first jaw in contact with the arcuate contact surface of the nose of the forming tool and the lengthwise extending portion has a second surface opposed to the first surface adjacent the first jaw in contact with the parti-cylindrical surface of the second jaw of the forming tool;

wherein the step of moving the nose of the forming tool along the parti-cylindrical surface of the second jaw of the forming tool includes moving the nose around the axis of the parti-cylindrical surface of the second jaw; and wherein the nose of the forming tool is pivotally mounted about a nose axis, and additionally rotates about the nose axis relative to the lengthwise extending portion of the strip during the moving step.

2. The method of claim 1, wherein during a majority of the step of moving the nose of the forming tool along the parti-cylindrical surface of the second jaw of the forming tool, a portion of the arcuate contact surface of the nose of the forming tool is separated from a portion of the parti-cylindrical surface of the second jaw of the forming tool.

3. The method of claim 1, wherein the nose of the forming tool rotates relative to the axis of the parti-cylindrical surface of the second jaw during the moving step.

4. The method of claim 1, wherein the arcuate contact surface of the nose of the forming tool is disposed in contact with the first surface of the lengthwise extending portion of the strip adjacent the first jaw at a predetermined contact pressure.

5. The method of claim 1, wherein, during a majority of the moving step, the arcuate contact surface of the nose of the forming tool contacts the first surface of the lengthwise extending portion of the strip adjacent the first jaw without sliding relative to the surface.

* * * * *